(12) United States Patent
Lysen

(10) Patent No.: US 6,611,323 B1
(45) Date of Patent: Aug. 26, 2003

(54) IMPACT-PROTECTING ADAPTATION DEVICE FOR LASER GYROS

(75) Inventor: Heinrich Lysen, Garching (DE)

(73) Assignee: Pruftechnik Dieter Busch AG, Ismaning (DE)

(*) Notice: Subject to any disclaimer, the term of this patent is extended or adjusted under 35 U.S.C. 154(b) by 532 days.

(21) Appl. No.: 09/587,261

(22) Filed: Jun. 5, 2000

(51) Int. Cl.⁷ .............................................. G01B 11/26
(52) U.S. Cl. .................................. 356/138; 356/139.05
(58) Field of Search ........................... 356/138, 139.05, 356/139.06, 139.07, 139.1

(56) References Cited

U.S. PATENT DOCUMENTS 5,365,671 A * 11/1994 Yaniger .................... 33/366.12
5,890,569 A    4/1999 Goepfert
6,195,615 B1   2/2001 Lysen

* cited by examiner

Primary Examiner—Frank G. Font
Assistant Examiner—Roy M. Punnoose
(74) Attorney, Agent, or Firm—Nixon Peabody LLP; David S. Safran

(57) ABSTRACT

An adapter for a laser gyro which acts at the same time as an impact shield. To do this, a laser gyro device is provided with a stable housing which has a jacket of elastic material. There is at least one reflecting element on the outer skin of the jacket. The reflecting element is optically connected to an optical transmitter and receiver which is securely attached in the stable housing. This optical transmitter and receiver determines the relative angular position of the reflecting element relative to the housing and thus relative to the laser gyro device. In this way, the orientation of large-volume articles to be measured, such as rollers, can be determined very accurately relative to the laser gyro device and hazard to the device by impacts is significantly reduced.

3 Claims, 1 Drawing Sheet

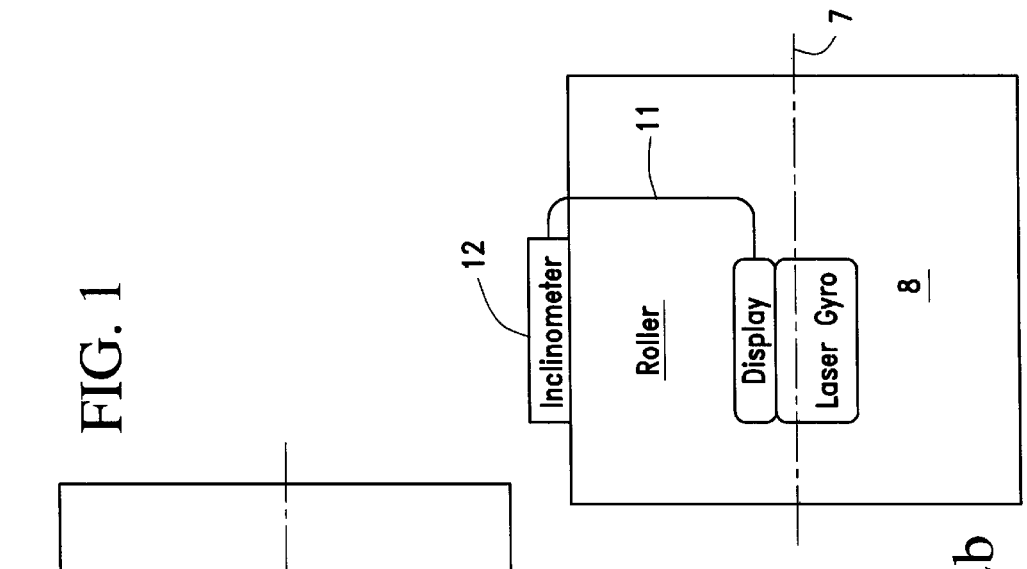
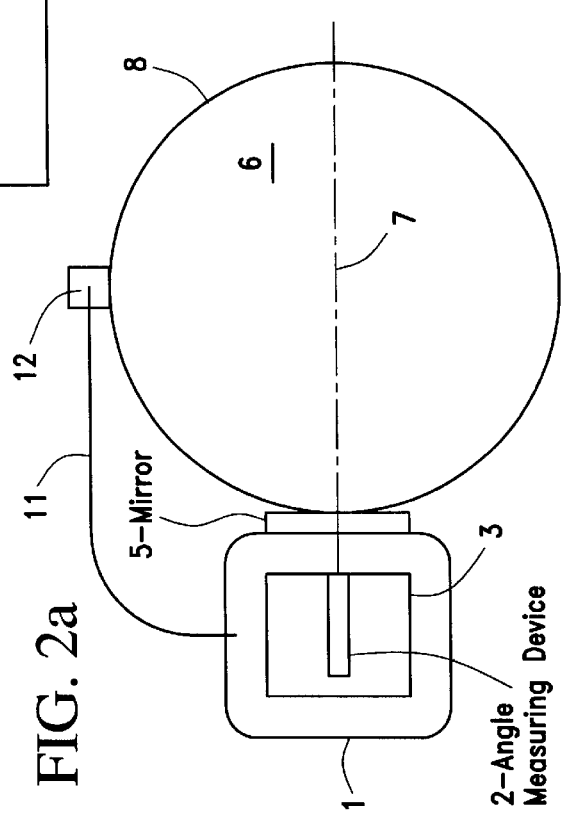

IMPACT-PROTECTING ADAPTATION DEVICE FOR LASER GYROS

BACKGROUND AND SUMMARY OF THE INVENTION

1. Field of the Invention

The invention relates to an impact-protecting device which can be used as an adapter for laser gyros.

2. Description of Related Art

Making available mechanical adapters for high-precision gyroscopes, especially those in the form of laser gyros, for articles to be measured in the form of large-volume rollers, is associated with major technical difficulties. The regularly necessary checking of the accuracy of these adapters is also associated with considerable effort.

Making available a suitable impact shield for sensitive laser gyros is a major problem when the impact shield is to assume only a minimum volume.

SUMMARY OF THE INVENTION

The primary object of the present invention is to provide a suitable impact shield as well as a suitable adaption device for laser gyros.

In particular, it is a related object to provide an impact shield which will prevent not only damage when falling, or overly hard deposition, of the gyro, but also will reduce impact in the proper arrangement of the gyro and an article such as, for example, a steel roller.

These objects are achieved in accordance with the invention by a laser gyro device being located in a stable housing which has a jacket of elastic material, and at least one reflecting element being attached to the outer surface of the jacket. The reflecting element is optically connected to a sending and receiving means for light beams, which is securely attached in the stable housing, which means are able, in a known manner, to determine the relative angular position of the reflecting element relative to the stable housing, and thus, relative to the laser gyro device. Fundamentally, this is done by pressing a corresponding mirror against the article to be measured, determining and recording the angle between the laser gyros and the mirror, and then offsetting them with the angular values (for example, azimuth, elevation, polarization or roll) of the laser gyro(s).

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 schematically shows a side view of a roller and an impact-protected laser gyro; and FIGS. 2a and 2b schematically show an impact-protected laser gyro on a face of a comparable roller together and a corresponding side view, respectively

DETAILED DESCRIPTION OF THE INVENTION

As FIG. 1 shows, the impact-protecting device according to the invention does not need an actual mechanical adaption device, for example, in the form of a prism, but the impact-protecting device can be attached directly to an article to be measured, for example, a roller 8. As shown in FIG. 1, a laser gyro 3, which can electronically specify at least one angular position, is protected against impact by its housing being enclosed in an jacket 1 of an elastic mirror. A mirror 5 is fixed to the outer surface of the jacket so that its reflecting surface 4 faces in the direction of the laser gyro.

If the mirror is pressed onto the end face 6 of the roller 8, the azimuth and elevation alignment of the roller 8 can be computed by the combined viewing of the absolute laser gyro position and the relative alignment of the mirror 5 with the aid of an angle measuring device 2 for this. The angular position with respect to the axis 7 of rotation of the roller 8 is thus unimportant.

FIG. 2 shows how the impact-protecting device together with the laser gyro is pressed in the horizontal direction and from the side against the circumference of the roller 8. With this measurement, the azimuth alignment of the roller 8 is determined. The elevation alignment of the roller is determined advantageously then by a precision-operating electronic inclinometer 12 which is dynamically connected by means of a signal line 11 to electronics assigned to the laser gyro. The positioning of the inclinometer 12 at the apex of the roller is not critical as long as it can determine the elevation alignment of the axis 7 of rotation accurately enough, as is shown in FIG. 2a.

Instead of using the inclinometer 12, in a separate working step, and optionally as a control measurement, the impact-protecting device together with the laser gyro(s) can be placed from overhead against the roller 8, by which likewise its elevation alignment can be determined.

What is claimed is:

1. Adaptation device for impact-protected connection of a laser gyro to articles to be measured, comprising:

a laser gyro having a housing;

a jacket of elastic material which is attached to the housing of the laser gyro and which at least partially surrounds the housing;

a reflector attached to the jacket;

a sending and receiving means which is securely joined to the housing for determining relative angular position of the reflector for measuring the angular orientation of an article to be measured relative to the laser gyro.

2. Process for determining the angular orientation of an article, comprising the following steps:

attaching of a reflective reference surface to a surface of an article to be measured;

determining the relative orientation of the reflective reference surface relative to an impact-protected laser gyro acting as an angle measuring device;

determining the orientation of the laser gyro;

determining the actual orientation of the article based upon the orientations determined in the preceding steps.

3. Process for determining the angular orientation of an article according to claim 2, wherein the laser gyro and reflective reference surface are attached horizontally to a circumferential surface of the article and an inclinometer is attached at an apex area of the article.

* * * * *